US012639673B2

(12) United States Patent (10) Patent No.: US 12,639,673 B2
Kouzen et al. (45) Date of Patent: May 26, 2026

(54) DAILY BUSINESS REPORT MANAGEMENT DEVICE AND DAILY BUSINESS REPORT MANAGEMENT SYSTEM

(71) Applicant: ISUZU MOTORS LIMITED, Tokyo (JP)

(72) Inventors: Chihiro Kouzen, Tokyo (JP); Tatsurou Ohashi, Tokyo (JP)

(73) Assignee: ISUZU MOTORS LIMITED, Tokyo (JP)

( * ) Notice: Subject to any disclaimer, the term of this patent is extended or adjusted under 35 U.S.C. 154(b) by 137 days.

(21) Appl. No.: 18/564,185

(22) PCT Filed: Jun. 16, 2022

(86) PCT No.: PCT/JP2022/024188
§ 371 (c)(1),
(2) Date: Nov. 27, 2023

(87) PCT Pub. No.: WO2023/276706
PCT Pub. Date: Jan. 5, 2023

(65) Prior Publication Data
US 2024/0273473 A1 Aug. 15, 2024

(30) Foreign Application Priority Data
Jun. 29, 2021 (JP) ................................. 2021-108027

(51) Int. Cl.
*G06Q 10/1091* (2023.01)
(52) U.S. Cl.
CPC ................................ *G06Q 10/1091* (2013.01)
(58) Field of Classification Search
CPC .............................................. G06Q 10/1091
See application file for complete search history.

(56) References Cited

U.S. PATENT DOCUMENTS 11,386,373 B2 * 7/2022 Itou ................... G06Q 10/06393
11,501,245 B2 * 11/2022 Atwood ............. G06Q 10/0838
(Continued)

FOREIGN PATENT DOCUMENTS

JP       H11-283172 A       10/1999
JP       2009-134339 A       6/2009
JP       2015-207270 A       11/2015

OTHER PUBLICATIONS

Knapíková, Lucia, et al. "Intelligent monitoring of loading and unloading process in enterprise transport system." International conference on future access enablers of ubiquitous and intelligent infrastructures. Cham: Springer International Publishing, 2022. (Year: 2022).*

(Continued)

*Primary Examiner* — Nathan A Mitchell
(74) *Attorney, Agent, or Firm* — PROCOPIO, CORY, HARGREAVES & SAVITCH LLP

(57) ABSTRACT
A daily business report management device includes a first acquisition unit for acquiring a start time for cargo handling work to an end time, cargo handling work and the vehicle ID from an onboard unit, a second acquisition unit for acquiring, from a mobile terminal, input information pertaining to the cargo handling work t and the vehicle ID for the vehicle where the cargo handling work was performed, and a storage control unit for causing a storage unit to store a work duration from the start time to the end time and the input information in mutual association if the vehicle ID, acquired by the second acquisition unit during a time between acquisition of the start time up until acquisition of the end time, matches the vehicle ID acquired by the first acquisition unit.

8 Claims, 8 Drawing Sheets

(56) References Cited

U.S. PATENT DOCUMENTS

| | | | | |
|---|---|---|---|---|
| 2012/0253548 | A1* | 10/2012 | Davidson | ......... G06Q 10/06398 |
| | | | | 701/1 |
| 2015/0046298 | A1* | 2/2015 | Zwakhals | ............ G06Q 10/087 |
| | | | | 705/28 |
| 2016/0180274 | A1* | 6/2016 | Zwakhals | ........ G06Q 10/06315 |
| | | | | 705/7.25 |
| 2017/0161967 | A1 | 6/2017 | Matsuo | |
| 2018/0137696 | A1* | 5/2018 | Takano | ................ G07C 5/0825 |
| 2018/0330306 | A1* | 11/2018 | Shaw | .................... A61B 5/1118 |
| 2018/0348012 | A1* | 12/2018 | An | ...................... B60R 16/0236 |
| 2020/0042936 | A1* | 2/2020 | Jain | ......................... G06F 40/14 |
| 2020/0292346 | A1* | 9/2020 | Turner | ................ G06Q 10/047 |
| 2020/0334637 | A1* | 10/2020 | Turner | ............ G06Q 10/08355 |
| 2021/0150467 | A1* | 5/2021 | Sakai | .................... F25D 29/003 |
| 2021/0291877 | A1* | 9/2021 | Yamamoto | ............. G06F 21/35 |
| 2021/0365680 | A1* | 11/2021 | Mossberg | ............. G06Q 10/08 |
| 2024/0249224 | A1* | 7/2024 | Urata | .................. G06Q 10/083 |

OTHER PUBLICATIONS

Hajdul, Marcin, and Arkadiusz Kawa. "Global logistics tracking and tracing in fleet management." Asian Conference on Intelligent Information and Database Systems. Cham: Springer International Publishing, 2015. (Year: 2015).*
Patent Cooperation Treaty, International Search Report, Application No. PCT/JP2022/024188, dated Aug. 23, 2022, in 4 pages.

* cited by examiner

| VEHICLE ID | | | | | | | |
|---|---|---|---|---|---|---|---|
| WORK CONTENT | START TIME | END TIME | LOCATION | NAME OF SHIPPER | WORKING TIME | SIGNATURE | INPUT TIME |
| Loading and unloading | 22:06 | 22:16 | Mimamori 1-chome | Maru-maru Express | 10 | 大統太郎 | 22:10 |
| | | | | Nico-nico Transport | | 山本一 | 22:15 |
| Loading and unloading | 23:30 | 23:50 | Mimamori 2-chome | Sankaku Express | 20 | NONE Absence of person in charge | 23:48 |
| ... | ... | ... | ... | ... | ... | ... | ... |

FIG. 7

DAILY BUSINESS REPORT MANAGEMENT DEVICE AND DAILY BUSINESS REPORT MANAGEMENT SYSTEM

CROSS-REFERENCE TO RELATED APPLICATIONS

The present application is a U.S. National Stage entry of PCT Application number PCT/JP2022/024188, filed on Jun. 16, 2022, which claims priority under 35 U.S.C § 119(a) to Japanese Patent Application No. 2021-108027, filed on Jun. 29, 2021, contents of which are incorporated herein by reference in their entirety.

TECHNICAL FIELD

The present disclosure relates to a daily work report management apparatus and a daily work report management system.

BACKGROUND OF THE INVENTION

There is known a technology for storing a working time taken for cargo work that is loading and unloading cargo onto and from a vehicle. For example, Patent Document 1 discloses a technology whereby a time acquired by subtracting a break time or a stand-by time from a time during which a door of a load chamber of a vehicle is opened is stored in a storage as a working time for cargo work.

PRIOR ART

Patent Document

Patent Document 1: Japanese Unexamined Patent Application Publication No. H11-283172

BRIEF DESCRIPTION OF THE INVENTION

Problem to be Solved by the Invention

When cargo work is performed, there is a demand to store information relating to the cargo work, such as a shipper of the cargo and a description of the cargo, in association with the working time as a daily work report. However, the technology in Patent Document 1 enables storage of a working time, but it does not make it possible to store information relating to cargo work and the working time in association with each other.

The present disclosure focuses on this point, and an object thereof is to store a daily work report that associates a working time for cargo work and information relating to the cargo work.

Means for Solving the Problem

A first aspect of the present disclosure provides a daily work report management apparatus that includes a first acquisition part that i) acquires a start time of cargo work that is loading and unloading cargo onto and from a vehicle and vehicle identification information for identifying the vehicle, from on-board equipment mounted on the vehicle, and ii) acquires, after acquiring the start time, an end time of the cargo work and the vehicle identification information from the on-board equipment, a second acquisition part that acquires input information relating to the cargo work inputted to a mobile terminal and vehicle identification information of a vehicle in which the cargo work was performed, from the mobile terminal, and a storage control part that stores i) a working time from the start time to the end time and ii) the input information in association with each other in a storage as a daily work report, if vehicle identification information acquired by the second acquisition part during a time from when the first acquisition part acquires the start time to when the first acquisition part acquires the end time is identical to vehicle identification information acquired by the first acquisition part.

The second acquisition part may acquire, from the mobile terminal, i) the input information including a signature image showing a signature inputted by a shipper of the cargo to the mobile terminal and ii) an input time at which the signature was inputted, and the storage control part may store, if the input time is before the end time, i) the input information including the signature image acquired and ii) the working time in association with each other in the storage as the daily work report.

The storage control part may not allow the input information including the acquired signature image to be stored in the storage if the input time is at or after the end time.

The daily work report management apparatus may further include a display control part that causes a display device to display i) the working time stored as the daily work report and ii) the signature image included in the input information, if the input information including the signature image is stored in the daily work report.

If a plurality of pieces of the input information are acquired during a time from the acquisition of the start time to the acquisition of the end time, the storage control part may store i) the plurality of pieces of the input information acquired and ii) the working time in association with each other in the daily work report, and the display control part may cause the display device to display a signature image of the most recent input time among the plurality of signature images stored in the daily work report, together with the working time.

The daily work report management apparatus may further include a display control part that causes a display device to display information indicating that the working time and the input information stored as the daily work report include the signature image, if the input information including the signature image is stored in the daily work report.

The second acquisition part may acquire, from the mobile terminal, the input information including reason information indicating a reason why the shipper of the cargo did not input a signature to the mobile terminal, and the storage control part may store the input information including the reason information acquired and the working time in association with each other in the storage as the daily work report.

The daily work report management apparatus may further include a display control part that causes a display device to display information indicating absence of a signature and a reason why a signature was not inputted indicated by the reason information, if the reason information is stored in association with the working time.

A second aspect of the present disclosure provides a daily work report management system including on-board equipment mounted on a vehicle, a mobile terminal, and a daily work report management apparatus, wherein the on-board equipment includes a detection part that detects a start and an end of cargo work that is loading and unloading cargo onto and from the vehicle, and an on-board equipment transmission part that i) transmits a start time at which the detection part detects a start of the cargo work and vehicle identification information for identifying the vehicle, to the daily work report management apparatus, and ii) transmits an end time at which the detection part detects an end of the cargo work and the vehicle identification information, to the daily work report management apparatus, wherein the mobile terminal includes a receiving part that receives input information relating to the cargo work inputted to the mobile terminal, and a terminal transmission part that transmits i) the input information received by the receiving part and ii) vehicle identification information of a vehicle in which the cargo work was performed, to the daily work report management apparatus, wherein the daily work report management apparatus includes a first acquisition part that i) acquires the start time and the vehicle identification information from the on-board equipment transmission part and ii) acquires, after acquiring the start time, the end time and the vehicle identification information from the on-board equipment transmission part, a second acquisition part that acquires the input information and vehicle identification information of a vehicle in which the cargo work was performed, from the terminal transmission part, and a storage control part that stores i) a working time from the start time to the end time and ii) the input information in association with each other in a storage as a daily work report, if vehicle identification information acquired by the second acquisition part during a time from when the first acquisition part acquires the start time to when the first acquisition part acquires the end time is identical to vehicle identification information acquired by the first acquisition part.

Effect of the Invention

According to the present disclosure, it is possible to store a daily work report that associates a working time for cargo work and information relating to the cargo work.

BRIEF DESCRIPTION OF THE DRAWINGS

FIG. 7 is a data table showing an example of a daily work report.

DESCRIPTION OF EMBODIMENTS

[Overview of Daily Work Report Management System S]

Figure 1:
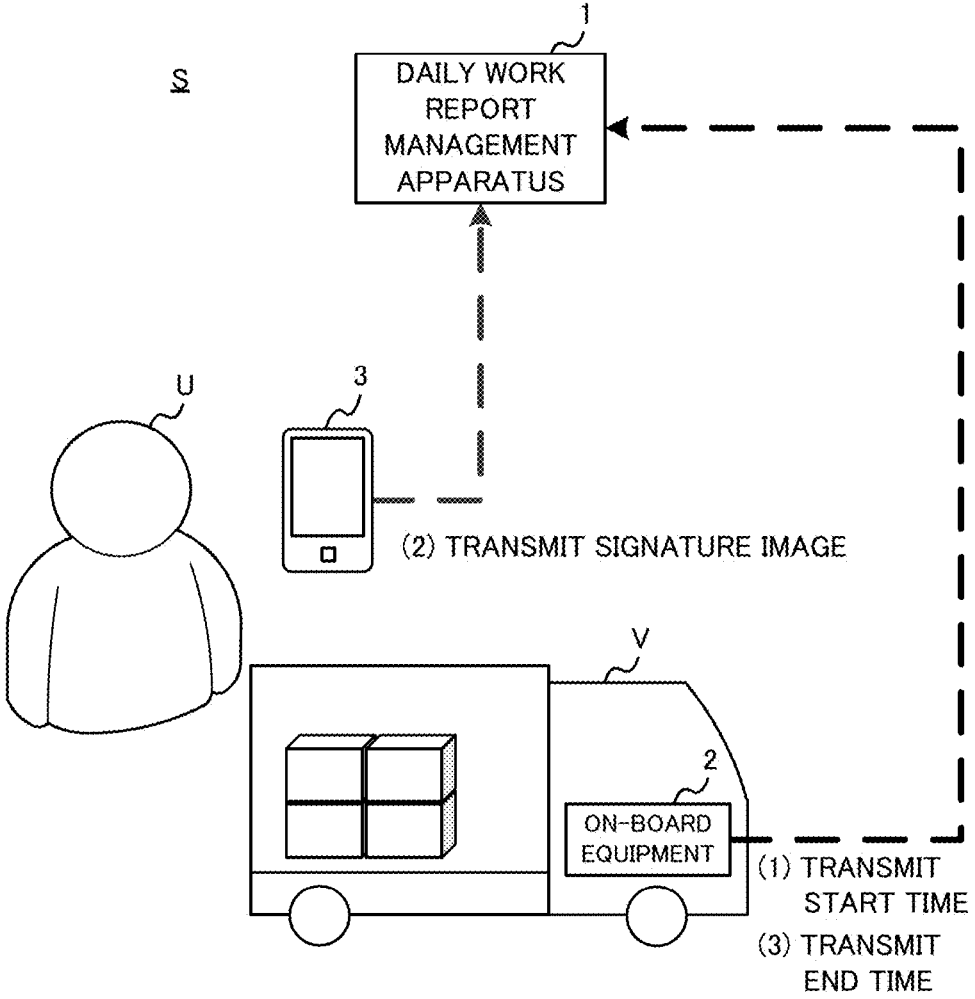
FIG. 1 illustrates an overview of a daily work report management system.

FIG. 1 illustrates an overview of a daily work report management system S. The daily work report management system S includes a daily work report management apparatus 1, on-board equipment 2, and a mobile terminal 3. The daily work report management system S is a system for managing information (hereinafter referred to as a "daily work report") about work relating to cargo work in which a worker U loads and unloads cargo onto and from a vehicle V.

The daily work report management apparatus 1 is an apparatus for managing the daily work report of the worker U, and is, for example, a server. The daily work report management apparatus 1 acquires information relating to the cargo work from the on-board equipment 2 and the mobile terminal 3. Hereinafter, the information relating to the cargo work may be referred to as work information.

The on-board equipment 2 is a digital tachograph mounted on the vehicle V, and is installed, for example, in the driver's seat of the vehicle V. The on-board equipment 2 automatically transmits the speed, time, and the like of the vehicle V during operation to the daily work report management apparatus 1. Further, the on-board equipment 2 can detect an operation state of the vehicle V. The worker U inputs the work information to the on-board equipment 2 before starting the cargo work. The on-board equipment 2 transmits the work information to the daily work report management apparatus 1.

The worker U can input a start operation which shows a start of the cargo work to the on-board equipment 2. When the on-board equipment 2 receives an input of the start operation, the on-board equipment 2 detects the start of the cargo work. The on-board equipment 2 then transmits a start time at which the start of the cargo work was detected to the daily work report management apparatus 1 ((1) in FIG. 1).

The mobile terminal 3 is a mobile terminal used by the worker U, and is, for example, a smartphone or a tablet. When the cargo work is finished, the worker U has a shipper of the cargo input a signature of the shipper to the mobile terminal 3. After the signature is inputted, the mobile terminal 3 transmits a signature image showing the signature inputted to the mobile terminal 3 by the shipper of the cargo, to the daily work report management apparatus 1 ((2) in FIG. 1).

After the mobile terminal 3 transmits the signature image, the worker U inputs an end operation, which shows that the cargo work is finished, to the on-board equipment 2. When the on-board equipment 2 receives the input of the end operation, the on-board equipment 2 detects an end of the cargo work. The on-board equipment 2 then transmits an end time at which the end of the cargo work was detected to the daily work report management apparatus 1 ((3) in FIG. 1).

The daily work report management apparatus 1 stores i) the working time from the start time to the end time transmitted by the on-board equipment 2 and ii) the signature image transmitted by the mobile terminal 3 in association with each other in a storage, as the daily work report. In this way, the daily work report management apparatus 1 can store the daily work report that associates i) the working time of the cargo work with ii) the signature image that shows, as the work information, the shipper's signature.

[Configuration of Each Unit]

Figure 2:
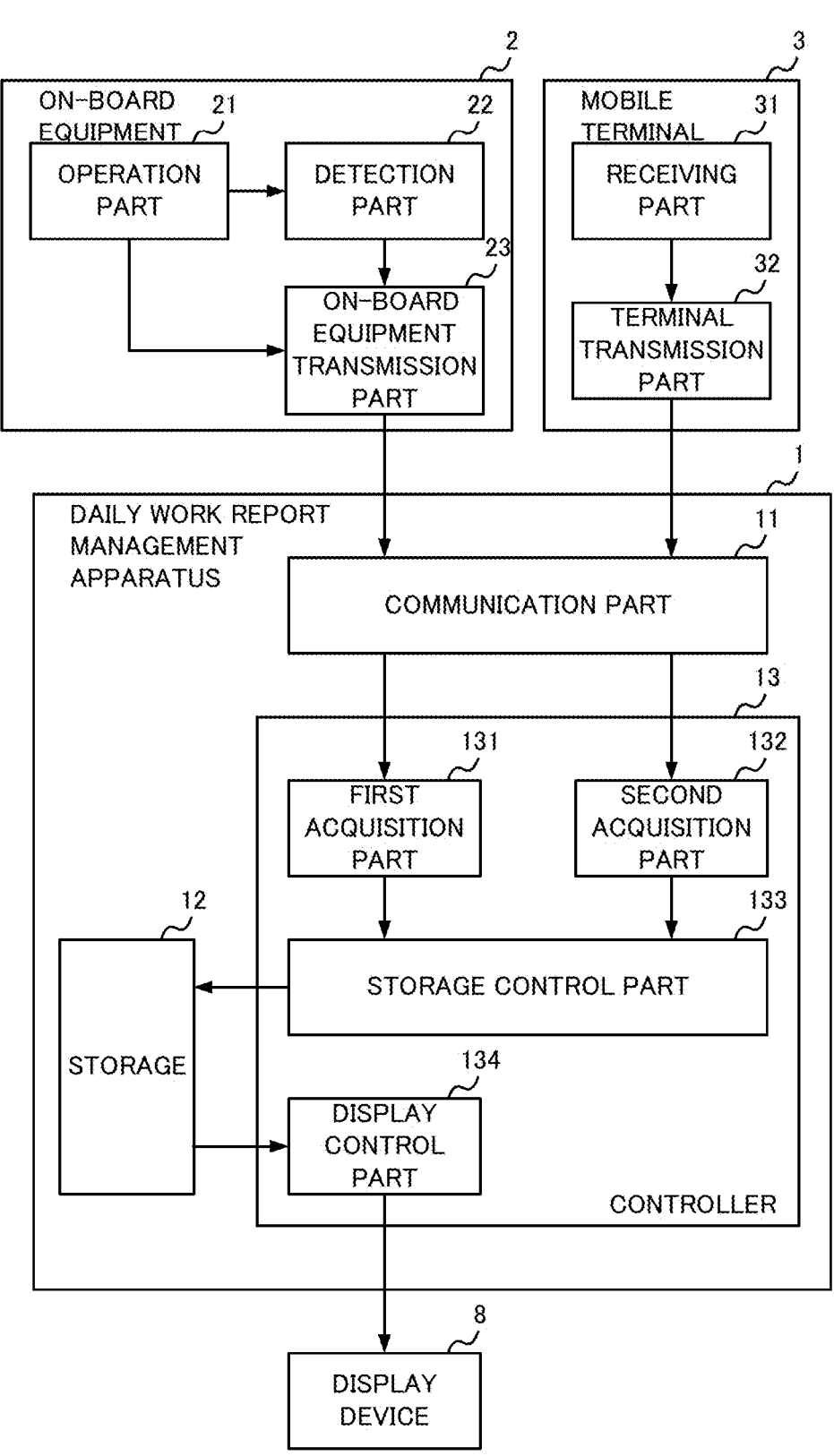
FIG. 2 illustrates a configuration of each unit included in the daily work report management system.

FIG. 2 illustrates a configuration of each unit included in the daily work report management system S.

The on-board equipment 2 includes an operation part 21, a detection part 22, and an on-board equipment transmission part 23. The on-board equipment 2 stores vehicle identification information (hereinafter, referred to as a "vehicle ID") for identifying the vehicle V.

The operation part 21 is an operation part for operating the on-board equipment 2, and includes, for example, a button, a switch, and a touch panel. More specifically, the operation part 21 includes a switch (hereinafter, referred to as a "loading and unloading switch") that says "loading and unloading." The worker U can perform the start operation and the end operation of the cargo work by operating the loading and unloading switch.

The worker U can input the work information to a touch panel of the operation part 21. The work information is determined by law or the like. The work information specifically includes a shipper of the cargo, a location where the cargo work is performed, work content, a description of the cargo, a quantity of the cargo, and a weight of the cargo (total weight). Hereinafter, the work information inputted to the operation part 21 is referred to as on-board equipment input information.

The detection part 22 detects the start and the end of the cargo work. The detection part 22 detects the start of the cargo work when the loading and unloading switch is turned on. The detection part 22 detects the end of the cargo work when the loading and unloading switch is turned off.

The on-board equipment transmission part 23 includes a wireless communication module that can transmit various kinds of information to the daily work report management apparatus 1 via wireless communication. The on-board equipment transmission part 23 transmits the on-board equipment input information and the vehicle ID to the daily work report management apparatus 1, for example, via the Internet.

The on-board equipment transmission part 23 transmits i) the start time at which the detection part 22 detects the start of the cargo work and ii) the vehicle ID in association with each other to the daily work report management apparatus 1. Further, the on-board equipment transmission part 23 transmits i) the end time at which the detection part 22 detects the end of the cargo work and ii) the vehicle ID to the daily work report management apparatus 1.

The mobile terminal 3 includes a receiving part 31 and a terminal transmission part 32. The mobile terminal 3 stores the vehicle ID of the vehicle V.

Figure 3:
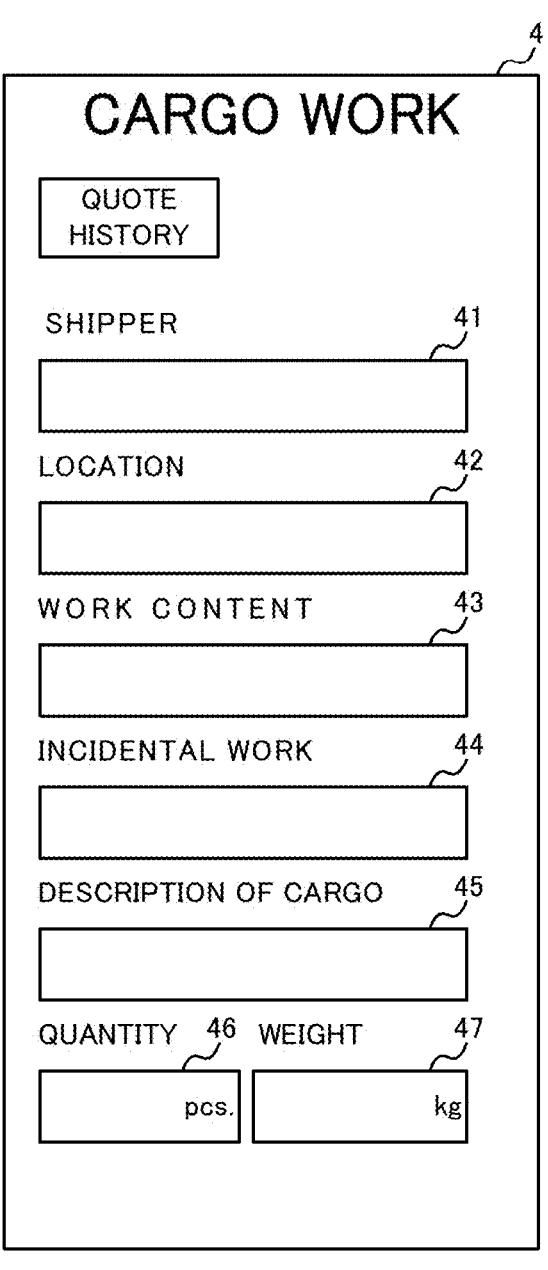
FIG. 3 is an example of a work information input screen.

The receiving part 31 is, for example, a touch panel that receives the input of various kinds of information. The worker U can operate the mobile terminal 3 to display a work information input screen for inputting the work information. FIG. 3 shows an example of a work information input screen 4. The receiving part 31 receives the work information for each item displayed on the work information input screen. The worker U can input content corresponding to the item in each input field of the work information input screen. For example, the worker U can input a company name as the name of the shipper of the cargo in an input field 41.

The information to be inputted to each input field is as follows. A location where the cargo work is performed is inputted to an input field 42. Content of the work (for example, loading and unloading) are inputted to an input field 43. Presence or absence of incidental work is inputted to an input field 44. The incidental work includes packing and sorting of cargo and the like incidental to the business of freight transport. A description of the cargo is inputted to an input field 45. A quantity of the cargo is inputted to an input field 46. A weight of the cargo (total weight) is inputted to an input field 47. Hereinafter, the work information inputted to the receiving part 31 is referred to as terminal input information.

Figure 4:
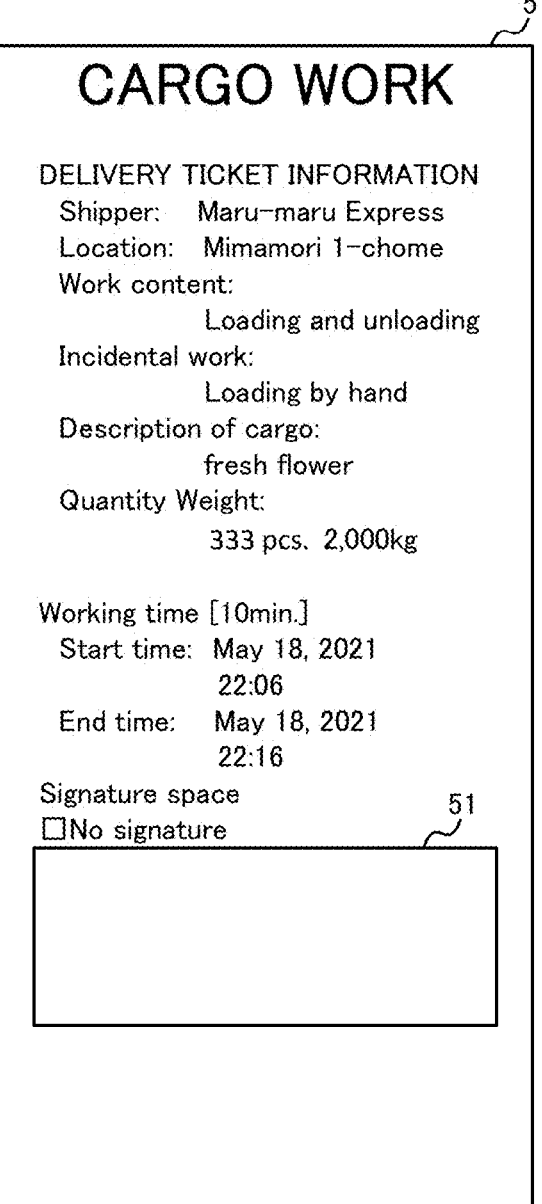
FIG. 4 is an example of a signature input screen for inputting a signature.

The receiving part 31 receives the signature inputted to the mobile terminal 3 by the shipper of the cargo, as one piece of the terminal input information. FIG. 4 is an example of a signature input screen 5 for inputting a signature. When all the plurality of input fields displayed on the work information input screen shown in FIG. 3 are filled, the receiving part 31 causes the signature input screen 5 to be displayed. Specifically, the receiving part 31 causes the signature input screen 5, including the work information that has been inputted to the plurality of input fields, to be displayed. The worker U presents the shipper of the cargo with the displayed signature input screen. The shipper of the cargo (for example, a person in charge of the shipper) checks the work information displayed on the presented mobile terminal 3 and inputs the person in charge's own signature to a signature space 51.

If the shipper did not sign, the receiving part 31 receives, as one piece of the terminal input information, an input from the worker U concerning a reason why the shipper of the cargo did not input his/her signature to the mobile terminal 3. The reason why the person in charge did not input the signature is absence of the person in charge of the shipper, for example.

The terminal transmission part 32 includes a wireless communication module capable of transmitting the terminal input information to the daily work report management apparatus 1 via wireless communication. When the terminal transmission part 32 receives the shipper's signature, the terminal transmission part 32 transmits i) the terminal input information including the signature image that shows the shipper's signature and ii) the vehicle ID to the daily work report management apparatus 1. Specifically, when the worker U performs an operation of transmitting the terminal input information, the terminal transmission part 32 transmits the terminal input information and the vehicle ID.

Figure 5:
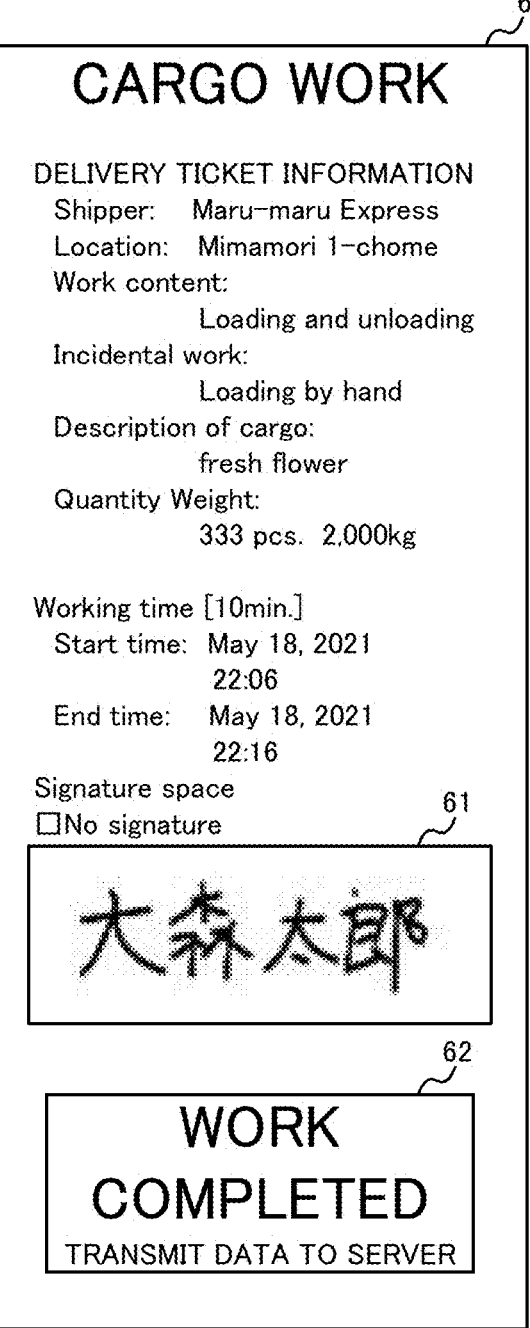
FIG. 5 is an example of a transmission screen for inputting an operation of transmitting terminal input information including a signature image.

FIG. 5 is an example of a transmission screen 6 for inputting an operation of transmitting the terminal input information including the signature image. The worker U checks the work content and a signature image 612 displayed on the transmission screen in FIG. 5, and then taps a button 62 that says [Work completed]. When the button 62 is tapped, the terminal transmission part 32 transmits i) the terminal input information including the signature image and ii) the vehicle ID to the daily work report management apparatus 1.

Figure 6:
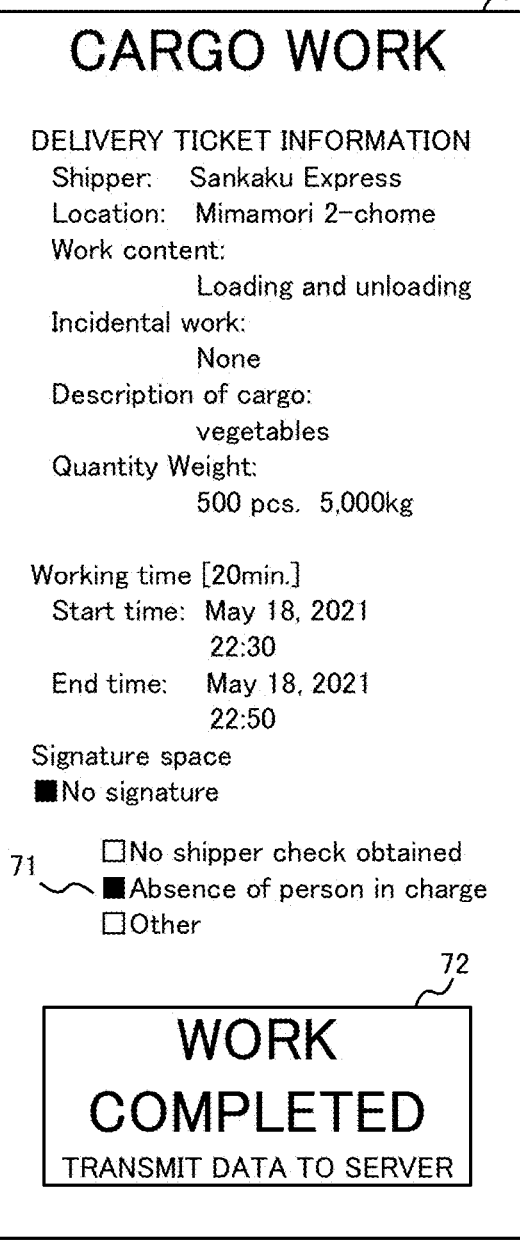
FIG. 6 is an example of a transmission screen for inputting an operation of transmitting terminal input information including reason information.

If the shipper did not sign, the terminal transmission part 32 transmits i) the terminal input information including the reason information indicating the reason why the signature was not inputted, instead of the signature image, and ii) the vehicle ID to the daily work report management apparatus 1. FIG. 6 is an example of a transmission screen 7 for inputting the operation of transmitting the terminal input information including the reason information. In the example shown in FIG. 6, a check box 71 for [Absence of person in charge] is checked as a reason for the absence of the shipper's signature. The worker U checks the work content and the reason for the absence of the signature displayed on the transmission screen in FIG. 6, and then taps a button 72 that says [Work completed]. When the button 72 is tapped, the terminal transmission part 32 transmits i) the terminal input information including the reason information and ii) the vehicle ID to the daily work report management apparatus 1.

The daily work report management apparatus 1 includes a communication part 11, a storage 12, and a controller 13. The communication part 11 is a communication module capable of receiving various kinds of information from the on-board equipment 2 and the mobile terminal 3. The communication part 11 receives the information relating to the cargo work from the on-board equipment 2 and the mobile terminal 3 via the Internet, for example.

The storage 12 is a storage medium including a Read Only Memory (ROM), a Random Access Memory (RAM), a hard disk, and the like. The storage 12 stores a program executed by the controller 13. The storage 12 stores a speed and a traveling time for the operation of the vehicle V, the working time and the work information concerning the cargo work, and the like as the daily work report.

FIG. 7 is a data table showing an example of the daily work report. As shown in FIG. 7, the daily work report stores the work content, the start time of the work, the end time of the work, the location where the work is performed, the name of the shipper of the cargo, the working time taken for the work, the signature image that shows the shipper's signature, and the input time when the signature was inputted. It should be noted that, in a case where there is no signature image, the input time is the time at which the reason for the absence of signature is inputted. The daily work report is associated with the vehicle ID and stored for each of a plurality of vehicles.

The controller 13 is a computational resource including a processor such as a Central Processing Unit (CPU). By executing the program stored in the storage 12, the controller 13 achieves functions as a first acquisition part 131, a second acquisition part 132, a storage control part 133, and a display control part 134.

The first acquisition part 131 acquires the on-board equipment input information and the vehicle ID that are received by the communication part 11 from the on-board equipment 2. Further, the first acquisition part 131 acquires the start time of the cargo work and the vehicle ID from the on-board equipment 2. After acquiring the start time, the first acquisition part 131 acquires the end time of the cargo work and the vehicle ID from the on-board equipment 2.

The second acquisition part 132 acquires the terminal input information and the vehicle ID that are received by the communication part 11 from the mobile terminal 3. For example, the second acquisition part 132 acquires i) the terminal input information including the signature image and ii) the input time at which the signature was inputted from the mobile terminal 3. Further, instead of the signature image, the second acquisition part 132 acquires the terminal input information including the reason information indicating the reason why the shipper of the cargo did not input the signature to the mobile terminal 3, from the mobile terminal 3.

The storage control part 133 stores the on-board equipment input information and the terminal input information in association with each other in the storage 12 as the daily work report. Specifically, if the vehicle ID acquired by the second acquisition part 132 is identical to the vehicle ID acquired by the first acquisition part 131, the storage control part 133 stores the on-board equipment input information and the terminal input information in association with each other. More specifically, the storage control part 133 stores the working time from the start time to the end time, the on-board equipment input information, and the signature image included in the terminal input information in association with each other. In this way, the storage control part 133 can manage pieces of work information that have been acquired separately as a single daily work report.

The storage control part 133 stores the signature image acquired during a time from the acquisition of the start time to the acquisition of the end time. Specifically, the storage control part 133 first determines whether the input time at which the signature was inputted is before the end time, when the terminal input information including the signature image is acquired. If the input time is before the end time, the storage control part 133 stores the daily work report that associates the signature image included in the acquired terminal input information with the working time.

If the input time at which the signature was inputted is at or after the end time, the storage control part 133 does not allow the terminal input information to be stored. Thus, the storage control part 133 can prevent storage of incorrect information by discarding terminal input information transmitted by mistake when no cargo work is being performed.

If a plurality of pieces of terminal input information are acquired during the cargo work, the storage control part 133 stores the acquired plurality of pieces of terminal input information in the daily work report in association with a single working time. Specifically, if a plurality of pieces of terminal input information including signature images are acquired during the time from the acquisition of the start time to the acquisition of the end time, the storage control part 133 stores i) the signature image of each piece of terminal input information and ii) the working time in association with each other in the daily work report.

If the terminal input information including the reason information is acquired, the storage control part 133 stores i) the reason information included in the acquired terminal input information and ii) the working time in association with each other in the storage 12 as the daily work report. In this way, an administrator who manages the operation of the worker U can check the reason for the absence of the shipper's signature.

The display control part 134 causes a display device 8 operated by the administrator to display the daily work report stored in the storage 12. For example, when an instruction, which is inputted to the display device 8 by the administrator, to display the daily work report is received, the display control part 134 causes the display device 8 to display the daily work report. Specifically, when the signature image is stored in the daily work report, the display control part 134 causes the display device to display the working time, the work information, and the signature image that are stored as the daily work report.

For example, the display control part 134 causes the data table shown in FIG. 7 to be displayed. The display control part 134 may cause the data table shown in FIG. 7 to be displayed with appropriate changes. In this way, the display control part 134 causes the data table in FIG. 7 to be displayed as the daily work report, and so the administrator can check the working time of the cargo work performed by the worker U, the presence or absence of the signature, and the like, and so it is easier for him/her to manage the work of the worker U.

The display control part 134 causes the display device 8 to display the signature image of the most recent input time among the plurality of signature images stored in the daily work report, together with the working time. For example, the display control part 134 causes the display device 8 to display only the signature image whose input time is [22:15], and does not cause the signature image whose input time is [22:10] to be displayed. In this way, the display control part 134 can prevent the daily work report from becoming complicated due to display of the plurality of signature images, and can display a concise daily work report.

Instead of causing the display device 8 to display the signature image, the display control part 134 may cause the display device 8 to display information indicating that the signature image is included in the input information. The Information Indicating that the signature Image is included is, for example, textual information "Present" or symbol information indicating "Present." Instead of causing each of the plurality of signature images associated with the single working time to be displayed, the display control part 134 causes the display device 8 to display, together with the working time, textual information indicating that these signature images are being included in the input information. Thus, the display control part 134 can cause the display device 8 to concisely display that each shipper signed at the time when cargos of a plurality of shippers were being loaded or unloaded during the time from the start time to the end time.

If the reason information indicating the reason for which a signature was not inputted is stored in association with the working time, the display control part 134 causes the display device 8 to display the information indicating that the signature is absent and the reason for which a signature was not inputted indicated by the reason information (see FIG. 7). The Information indicating the absence of the signature is, for example, the textual information "Absent" or symbol information indicating "Absent." The reason for the absence of the signature is, for example, "a person in charge was absent." In this way, the administrator can grasp the absence of the shipper's signature and the reason why a signature was not inputted.

[Process of Daily Work Report Management System S]

Figure 8:
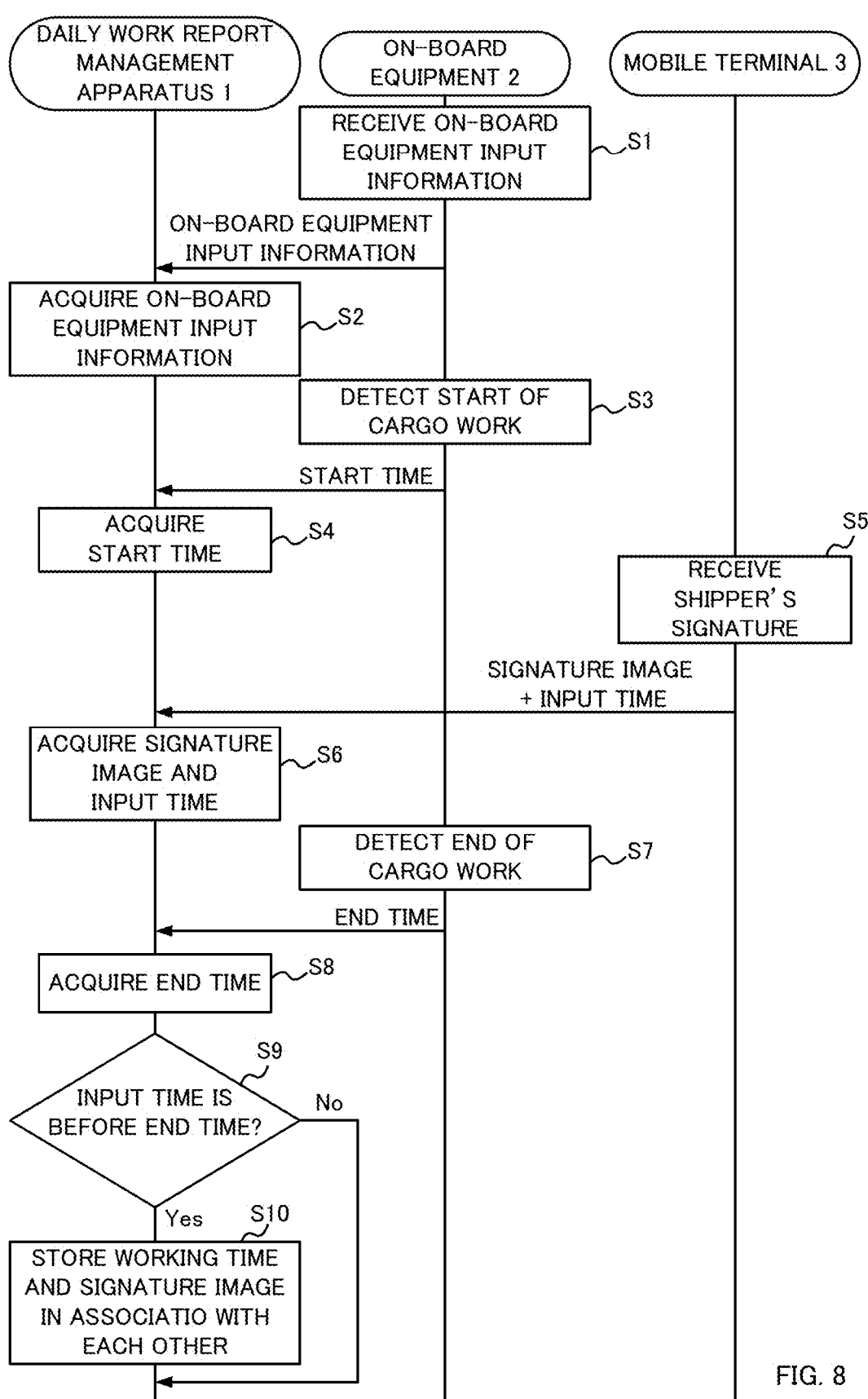
FIG. 8 is a sequence diagram showing an example of a process of the daily work report management system.

FIG. 8 is a sequence diagram showing an example of a process of the daily work report management system S. The process of the sequence shown in FIG. 8 is started when the worker U inputs the work information to the on-board equipment 2 to start the cargo work.

The on-board equipment 2 receives the on-board equipment input information (step S1). Specifically, the on-board equipment 2 receives the on-board equipment input information including the name of the shipper, location, work content, presence or absence of incidental work, description of the cargo, quantity, and weight. The on-board equipment 2 transmits i) the on-board equipment input information inputted to the on-board equipment 2 and ii) the vehicle ID of the vehicle V to the daily work report management apparatus 1. The daily work report management apparatus 1 acquires the on-board equipment input information and the vehicle ID transmitted from the on-board equipment 2 (step S2).

The on-board equipment 2 detects the start of the cargo work when the worker U inputs the start operation of the cargo work, which is turning on the loading and unloading switch (step S3). The on-board equipment 2 then transmits the start time at which the start of the cargo work was detected and the vehicle ID to the daily work report management apparatus 1. Then, the daily work report management apparatus 1 acquires the start time and the vehicle ID transmitted from the on-board equipment 2 (step S4).

The mobile terminal 3 receives the shipper's signature inputted by the shipper of the cargo after the worker U finishes the cargo work (step S5). Subsequently, when the mobile terminal 3 receives an input of an operation of transmitting the signature image, the mobile terminal 3 transmits the terminal input information including the signature image that shows the shipper's signature to the daily work report management apparatus 1. Specifically, the mobile terminal 3 transmits the terminal input information including the signature image, the input time at which the signature was inputted, and the vehicle ID. The daily work report management apparatus 1 then acquires the terminal input information including the signature image, the input time, and the vehicle ID from the mobile terminal 3 (step S6).

When the worker U inputs the end operation of the cargo work, which is turning off the loading and unloading switch, the on-board equipment 2 detects the end of the cargo work (step S7). Subsequently, the on-board equipment 2 transmits the end time at which the end of the cargo work was detected and the vehicle ID to the daily work report management apparatus 1. Then, the daily work report management apparatus 1 acquires the end time and the vehicle ID transmitted from the on-board equipment 2 (step S8).

The daily work report management apparatus 1 determines whether or not the input time acquired from the mobile terminal 3 is before the end time acquired from the on-board equipment 2 (step S9). If the input time is before the end time (Yes in step S9), the daily work report management apparatus 1 stores the working time from the start time to the end time and the signature image included in the terminal input information in association with each other in the storage 12 as the daily work report (step S10). If the input time is at or after the end time (No in step S9), the daily work report management apparatus 1 stores only the working time as the daily work report, without associating it with the acquired signature image.

[Effect of Daily Work Report Management Apparatus 1]

As described above, the daily work report management apparatus 1 acquires the start time and the end time of the cargo work from the on-board equipment 2, and acquires the information relating to the cargo work from the mobile terminal 3. And, if the daily work report management apparatus 1 acquires the information relating to the cargo work between the start time and the end time, the daily work report management apparatus 1 stores the working time from the start time to the end time and the information relating to the cargo work in association with each other in the storage 12 as the daily work report.

In this way, the daily work report management apparatus 1 can acquire the information relating to the cargo work inputted to the mobile terminal 3, for example, when the worker U is performing the cargo work away from the on-board equipment 2, and stores the information as the daily work report. Therefore, when it becomes necessary to input the information relating to the cargo work, the worker U does not have to return to the driver's seat of the vehicle V where the on-board equipment 2 is installed, but only needs to input the information relating to the cargo work to the mobile terminal 3. As an example, the worker U can have the shipper's signature inputted to the mobile terminal 3 by the shipper of the cargo when the cargo work is finished, and so the worker U can store, in the daily work report, that the shipper checked the cargo work.

(Variation 1)

The daily work report management apparatus 1 may manage the incidental work, which is packing and sorting of cargo and the like incidental to the business of freight transport, by including it in the cargo work, or by managing it separately from the cargo work. It should be noted that, In the above embodiment, the presence or absence of the incidental work is inputted in the input field 44 of the work information input screen 4, but the present disclosure is not limited thereto, and the type of incidental work that was performed may be inputted in the input field 44.

(Variation 2)

The mobile terminal 3 may be able to measure the working time of the cargo work. In this case, the mobile terminal 3 displays a screen for inputting the start and the end of the cargo work. The screen for inputting the start and the end is, for example, a screen that starts measuring the time when the screen is tapped, and ends measuring the time when the screen is tapped again. The mobile terminal 3 transmits a first time, at which the screen is first tapped after the screen for inputting the start and the end is displayed, to the daily work report management apparatus 1 as the start time of the cargo work. The mobile terminal 3 transmits a second time, at which the screen is tapped again after the first tap, as the end time of the cargo work. It should be noted that the mobile terminal 3 may transmit the first time or the second time to the daily work report management apparatus 1 as the input time of the signature.

(Variation 3)

In the above-described embodiment, the daily work report management apparatus 1 stores the working time, the on-board equipment input information, and the signature image included in the terminal input information in the storage 12 as the daily work report. Instead of the on-board equipment input information, the daily work report management apparatus 1 may store all pieces of the terminal input information acquired from the mobile terminal 3 in the storage 12 as the daily work report. In addition, the daily work report management apparatus 1 may store the working time measured by the mobile terminal 3 as the daily work report.

(Variation 4)

The daily work report is stored in the storage 12 of the daily work report management apparatus 1, but the present disclosure is not limited thereto, and the daily work report may be stored in an external database server.

The present disclosure is explained on the basis of the exemplary embodiments. The technical scope of the present disclosure is not limited to the scope explained in the above embodiments and it is possible to make various changes and modifications within the scope of the disclosure. For example, all or part the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

S: daily work report management system
1: daily work report management apparatus
11: communication part
12: storage
13: controller
131: first acquisition part
132: second acquisition part
133: storage control part
134: display control part
2: on-board equipment
21: operation part
22: detection part
23: on-board equipment transmission part
3: mobile terminal
31: receiving part
32: terminal transmission part
8: display device
U: worker
V: vehicle

The invention claimed is:

1. A daily work report management apparatus comprising:
a communication module that i) receives a start time at which a worker, who performs cargo work that is loading and unloading cargo onto and from a vehicle, inputs a start operation of the cargo work to on-board equipment mounted on the vehicle and vehicle identification information for identifying the vehicle, from the on-board equipment, via wireless communication, and ii) receives, after receiving the start time, an end time at which the worker inputs an end operation of the cargo work to the on-board equipment and the vehicle identification information from the on-board equipment, via the wireless communication, and iii) receives input information including a signature of a shipper of the cargo inputted to an input field displayed on a screen of a mobile terminal, as a signature image showing the signature of the shipper, vehicle identification information of a vehicle in which the cargo work was performed, and an input time at which the signature was inputted, from the mobile terminal, via the wireless communication;
a storage medium that stores a daily work report indicating information of a work related to the cargo work of the worker; and
a processor that i) determines, if vehicle identification information received from the mobile terminal during a time from when the communication module receives the start time from the on-board equipment to when the communication module receives the end time is identical to vehicle identification information received from the on-board equipment by the communication module, whether or not the inputted time received from the mobile terminal by the communication module is earlier than the end time acquired from the on-board equipment by the communication module, ii) stores, if the inputted time is earlier than the end time, a working time from the start time to the end time received from the on-board equipment by the communication module and the input information including the signature image received from the mobile terminal by the communication module in association with each other in the storage medium as the daily work report managed for each piece of vehicle identification information, iii) stores, if the inputted time is equal to or later than the end time, only the work time in the storage medium as the daily work report without associating with the input information including the signature image, and iv) causes a display device to display the working time stored as the daily work report and the signature image included in the input information.

2. The daily work report management apparatus according to claim 1, wherein the processor does not allow the input information including the acquired signature image to be stored in the storage medium if the input time is at or after the end time.

3. The daily work report management apparatus according to claim 1, wherein the processor causes a display device to display i) the working time stored as the daily work report and ii) the signature image included in the input information, if the input information including the signature image is stored in the daily work report.

4. The daily work report management apparatus according to claim 3, wherein if a plurality of pieces of the input information are received during a time from acquisition of the start time to acquisition of the end time, the processor stores i) the plurality of pieces of the input information received and ii) the working time in association with each other in the daily work report, and the processor causes the display device to display a signature image of a most recent input time among the plurality of signature images stored in the daily work
report, together with the working time.

5. The daily work report management apparatus accord-
ing to claim 1,
    wherein the processor causes a display device to display
    information indicating that the working time and the
    input information stored as the daily work report
    include the signature image, if the input information
    including the signature image is stored in the daily
    work report.

6. The daily work report management apparatus accord-
ing to claim 1, wherein
    the communication module receives, from the mobile
    terminal, the input information including reason infor-
    mation indicating a reason why the shipper did not
    input the signature to the mobile terminal, and
    the processor stores the input information including the
    reason information acquired and the working time in
    association with each other in the storage medium as
    the daily work report.

7. The daily work report management apparatus accord-
ing to claim 6,
    wherein the processor causes a display device to display
    information indicating absence of the signature and a
    reason why the signature was not inputted indicated by
    the reason information, if the reason information is
    stored in association with the working time.

8. A daily work report management system comprising
on-board equipment mounted on a vehicle, a mobile termi-
nal, and a daily work report management apparatus, wherein
    the on-board equipment includes;
        a switch for a worker, who performs cargo work that is
        loading and unloading cargo onto and from the
        vehicle, inputs a start operation and an end operation
        of the cargo work, and
        a wireless communication module that i) transmits a
        start time at which the start operation of the cargo
        work was performed on the switch and vehicle
        identification information for identifying the vehicle,
        to the daily work report management apparatus, and
        ii) transmits an end time at which the end operation
        of the cargo work was performed on the switch and
        the vehicle identification information, to the daily
        work report management apparatus, wherein
        the mobile terminal includes:
            a touch panel that receives an input of a signature
            of a shipper of the cargo as input information
            relating to the cargo work, and
            a communication module that transmits, via wire-
            less communication, i) the input information
            including the signature of the shipper of the
            cargo inputted to an input field displayed on the
            touch panel, as a signature image showing the
            signature of the shipper, ii) vehicle identifica-
            tion information of a vehicle in which the cargo work was performed, and iii) an input time at
which the signature was inputted, to the daily
work report management apparatus, wherein
    the daily work report management apparatus i)
    receives, via the wireless communication, the start
    time and the vehicle identification information
    from the communication module of the on-board
    equipment, ii) receives, after receiving the start
    time, the end time and the vehicle identification
    information from the communication module, via
    the wireless communication, and iii) receives, via
    the wireless communication, the input informa-
    tion, vehicle identification information of a
    vehicle in which the cargo work was performed,
    and the inputted time from the wireless commu-
    nication module of the mobile terminal;
    a storage medium that stores a daily work report
    indicating information of a work related to the
    cargo work of the worker; and
    a processor that
        i) determines, if vehicle identification information
        received from the wireless communication
        module of the mobile terminal during a time
        from when the communication module receives
        the start time from the wireless communication
        module of the on-board equipment to when the
        communication module receives the end time is
        identical to the vehicle identification informa-
        tion received from the wireless communication
        module of the on-board equipment by the com-
        munication module, whether or not the inputted
        time received from the wireless communication
        module of the mobile terminal by the commu-
        nication module is earlier than the end time
        received from the on-board equipment by the
        communication module, ii) stores, if the input-
        ted time is earlier than the end time, a working
        time from the start time to the end time received
        from the wireless communication module of the
        on-board equipment by the communication
        module and the input information received from
        the wireless communication module of the
        mobile terminal by the communication module
        in association with each other in the storage
        medium as the daily work report managed for
        each piece of vehicle identification information,
        iii) stores, if the inputted time is equal to or later
        than the end time, only the work time in the
        storage medium as the daily work report with-
        out associating with the input information
        including the signature image, and iv) causes a
        display device to display the working time
        stored as the daily work report and the signature
        image included in the input information.

* * * * *